United States Patent [19]
Torpey

[11] 3,894,953
[45] July 15, 1975

[54] WASTEWATER TREATMENT PLANT
[75] Inventor: Wilbur N. Torpey, Douglaston, N.Y.
[73] Assignee: Autotrol Corporation, Milwaukee, Wis.
[22] Filed: May 29, 1973
[21] Appl. No.: 364,509

[52] U.S. Cl. ................ 210/151; 210/170; 210/199
[51] Int. Cl. ............................................. C02c 1/04
[58] Field of Search ............ 210/2, 14, 16, 17, 150, 210/151, 170, 253, 319, 322, 513, 521, 522, 525, 532 R, 532 S, 199

[56] References Cited
UNITED STATES PATENTS

| | | | |
|---|---|---|---|
| 924,664 | 6/1909 | Imhoff | 210/320 |
| 978,889 | 12/1910 | Imhoff | 210/2 |
| 1,286,017 | 11/1918 | Jones | 210/522 X |
| 1,289,378 | 12/1918 | Brown | 210/2 |
| 1,485,452 | 3/1924 | Dovel | 210/322 |
| 2,416,867 | 3/1947 | Coberly | 210/322 X |
| 3,335,081 | 8/1967 | El-Naggar | 210/150 X |
| 3,465,889 | 9/1969 | Young, Jr. | 210/525 X |

FOREIGN PATENTS OR APPLICATIONS

| 159,416 | 3/1933 | Switzerland | 210/513 |
|---|---|---|---|

*Primary Examiner*—Charles N. Hart
*Assistant Examiner*—Robert H. Spitzer
*Attorney, Agent, or Firm*—Kenneth A. Koch, Esq.

[57] ABSTRACT

A modified septic tank with a plurality of troughs arranged to be fed in parallel controls the detention time of wastewater passing through the troughs to the range of from 2 to 4 hours thereby minimizing the addition of gasses to the effluent wastewater, particularly hydrogen sulphide that is evolved in the lower portion of the tank in connection with the digestion of settled organic solids. A biological treatment unit such as those employing rotating contactors can be provided to treat the effluent from the septic tank. The substantial reduction in hydrogen sulphide in the effluent wastewater from the septic tank makes available a maximum amount of surface for the growth and maintenance of organisms oxidizing carbonaceous and/or nitrogenous pollutants on the downstream rotating contactors.

10 Claims, 5 Drawing Figures

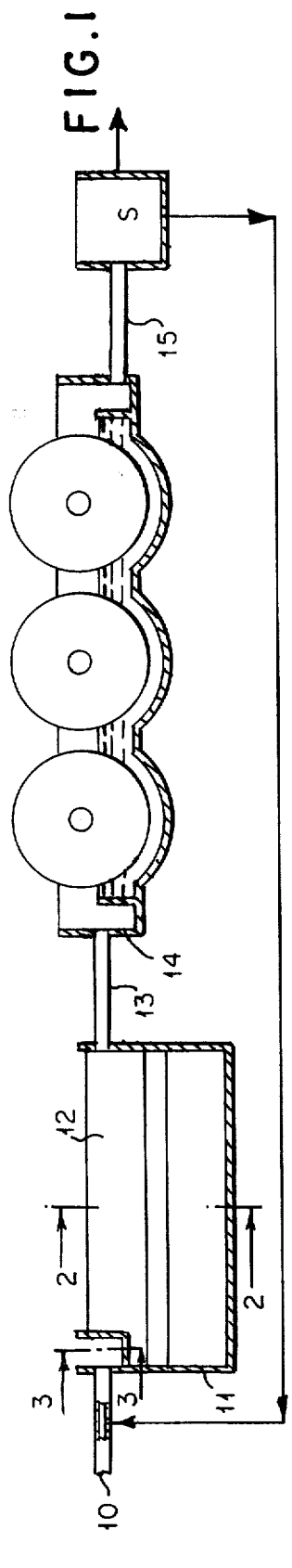
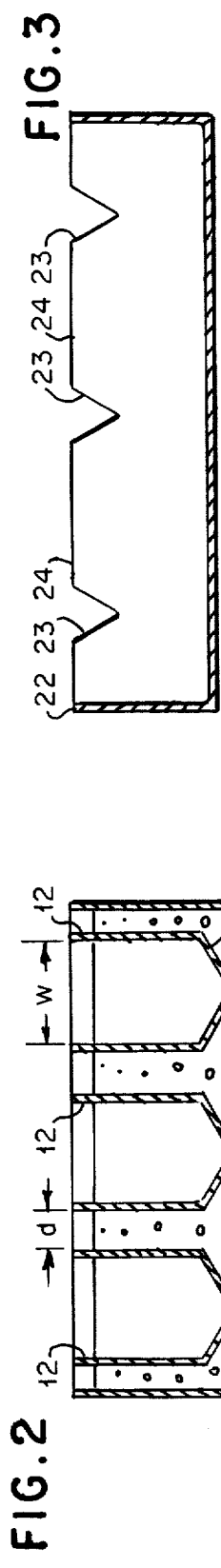
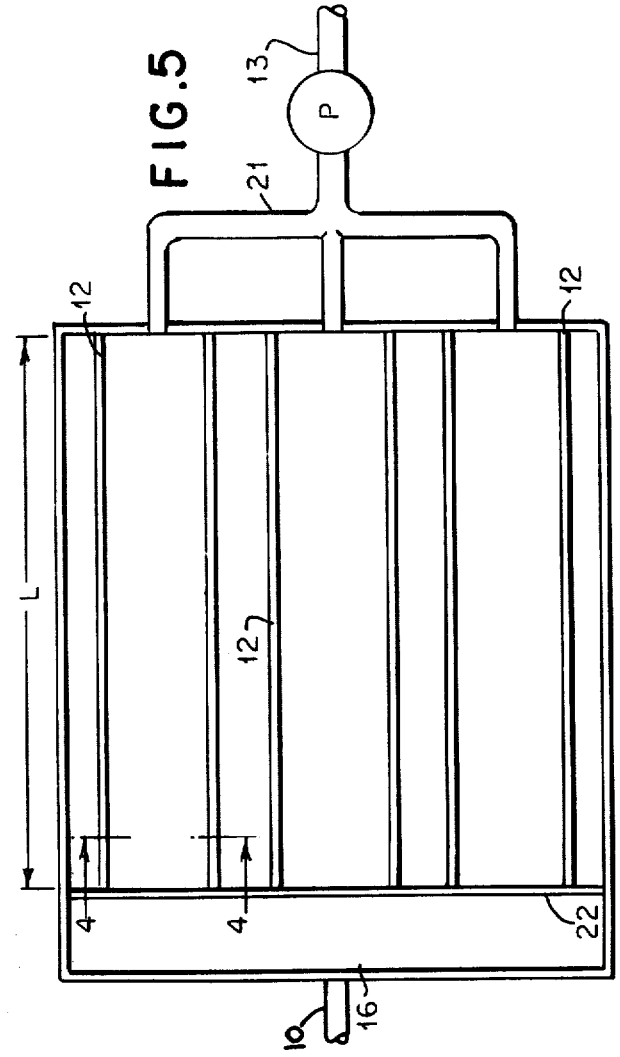
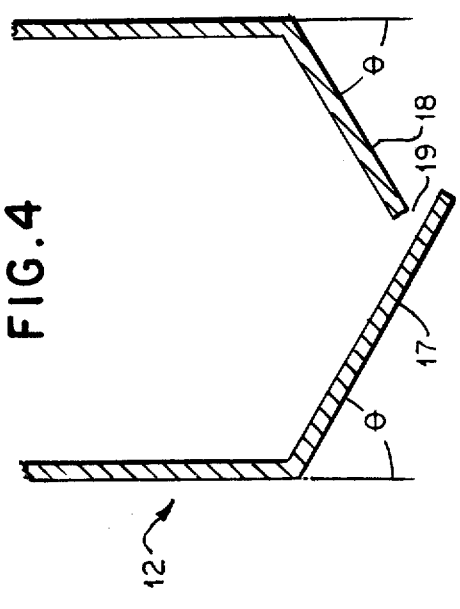

WASTEWATER TREATMENT PLANT

BACKGROUND AND PRIOR ART

The invention pertains to the treatment of wastewater to remove pollutants. Specifically, in one of its aspects, the invention provides an improved apparatus for removing organic matter from domestic wastewater, consolidating and digesting the removed solids. More specifically, the improved apparatus includes a treatment tank having an upper sedimentation zone for removing particulate organic matter from wastewater, utilizing substantially reduced detection times and a subjacent solids accumulation zone wherein the settled matter is digested. A downstream secondary treatment unit to remove and oxidize organic matter alone or both organic and nitrogenous pollutants can also be provided in combination with the improved settling-digestion apparatus. Further, the solids captured and generated by the downstream biological treatment can be returned to the influent of the improved septic tank for separation and consolidation.

The combined functions of settling particulate organic matter from wastewater and biochemically converting the accumulated matter to sludge is well known in the wastewater treatment art. Apparatus of this type are generally known in the art as septic tanks and are shown in Imhoff U.S. Pat. Nos. 978,889, 1,642,206, 1,692,446 and 1,925,679; Howe et al. U.S. Pat. No. 2,272,004 and Allen U.S. Pat. No. 3,251,471 among others.

Septic tanks function to remove settleable organic solids, grit, screenable materials and grease from wastewater as well as to provide for the digestion of settled organic matter by anaerobic bacterial decomposition. To separate the solids removal function from the digestion, a flow-through chamber is constructed at the tank surface in such manner that the solids removed therein are conducted to the lower zone. Apparatus of this type as described in the aforementioned patents typically comprise horizontally disposed chambers in vertical juxtaposition and in hydraulic communication with each other, the upper chamber functioning as a settling or clarifying station through which wastewater is passed directly from the influent means of the combined unit to the effluent means thereof. The lower chamber functions to anaerobically decompose solids removed by gravity from the wastewater in the course of its passage through the upper chamber. Septic tanks of this type are commonly referred to in the art as Imhoff tanks.

In the operation of a typical septic tank the influent wastewater is detained in the apparatus for about 24 hours during which time grease, grit and particulate organic matter are removed by being settled to the bottom. The accumulated solids at the bottom of the tank are anaerobically decomposed with the generation of gasses such as methane and carbon dioxide. As much as one half of the accumulated organic solids are converted to gaseous products by digestion. During warmer weather, when the wastewater temperature rises above 60°F., the generation of hydrogen sulphide gas becomes evident. As the temperature increases, the volume of hydrogen sulphide gas produced by the anaerobic decomposition increases. Since hydrogen sulphide is fairly soluble in water, a substantial portion of this gas that is generated is contained in the effluent wastewater. Typically, the effluent from a septic tank is percolated into the ground and its hydrogen sulphide content is of little, if any, consequence. The digested sludge is periodically removed from the unit and disposed of by various means well known in the art.

Although septic tanks are effective in removing and decomposing organic solids present in wastewater such as normal domestic wastewater, the effluent from units of this type contain significant concentrations of soluble carbonaceous matter, usually expressed as BOD (Biological Oxygen Demand) and oxidizable nitrogenous matter, primarily ammonia and albuminoid nitrogen. Septic tank effluent that is percolated into the ground can find its way to potable underground water supplies as well as lakes, rivers and streams, depending on the characteristics of the soil and the design of the septic system. Governmental regulations, particularly where potable water supplies are involved, make the secondary treatment of septic tank effluent to remove soluble carbonaceous and nitrogenous matter mandatory where the percolation capacity of the soil is not satisfactory or becomes exhausted.

A primary objective of the invention is to provide a wastewater treatment facility employing modified septic tanks to remove and digest solid organic pollutants as well as to remove sand, grease, grit, etc. from wastewater in combination with a secondary treatment unit to biochemically remove or oxidize soluble carbonaceous matter alone or in addition to the nitrogenous matter present, in the septic tank effluent. Secondary treatment facilities known in the art include the activated sludge process wherein suspended biological forms are utilized to oxidize carbonaceous pollutants; the trickling filtration process wherein fixed biological slimes are grown on a stationary media and the rotating biological contactor process wherein biological slimes are grown on rotating surfaces that are alternately exposed to the atmosphere and immersed in the wastewater.

A preferred biological process for treating wastewater to oxidize carbonaceous matter utilizes rotating biological contactors in the form of a plurality of closely spaced, partially submerged bodies, to grow fixed biological slimes. The rotating biological contactors can be in the form of thin discs, drums, cylinders, brushes, etc. A preferred contactor has a discontinuous honeycomb-type structure and is disclosed in pending U.S. patent application Ser. No. 252,038 filed May 10, 1972.

The partially submerged bodies are forcibly rotated to alternately expose the organisms on the contact surfaces to the atmosphere for the absorption of oxygen and immersed in the wastewater for nutrients at a peripheral velocity suitable for the growth and maintenance of aerobic biological organisms. Such rotating biological contactors are typically arranged to subject the wastewater to sequential treatment by three to six stages arranged in series. Secondary treatment systems of this type are capable of removing 95% BOD and of oxidizing the ammonia, depending on the specific operating conditions.

Representative wastewater treatment systems utilizing a multistage configuration of partially submerged rotating biological contactors for the sequential treatment of wastewater are shown and described in Torpey U.S. Pat. No. 3,575,849; El Naggar U.S. Pat. No. 3,335,081; Simpson U.S. Pat. No. 3,466,241; and Hartmann et al. U.S. Pat. No. 3,389,798. Rotating biological contactors can also be operated to simultaneously remove or oxidize carbonaceous and nitrogenous pollutants as disclosed in detail in copending application Ser. No. 293,594 filed Sept. 29, 1972, now U.S. Pat. No. 3,817,857 issued June 4, 1974.

A further objective of the invention is to provide a modified septic tank wherein the effluent is substantially free from hydrogen sulphide. Although the use of rotating biological contactors for the secondary treatment of septic tank effluent is advantageous, a serious efficiency reducing problem develops when the septic tank effluent (secondary treatment unit influent) contains a significant amount of dissolved hydrogen sulphide, which would be the case during normal operation of a septic tank at a wastewater temperature above about 60°F.

The presence of hydrogen sulphide in the influent to the rotating disc secondary treatment plant creates an environment wherein sulfur-oxidizing filamentous organisms known as beggiatoa dominate and capture a significant portion of the rotating surface thereby leaving a lesser amount of surface available for the growth and maintenance of organisms that oxidize carbonaceous and nitrogenous pollutants. Hydrogen sulphide presence in the biological treatment unit interferes with the oxidation of ammonia and carbonaceous matter by occupying contactor surface resulting in decreased effectiveness of the secondary treatment.

SUMMARY OF THE INVENTION

In accordance with the invention, a modified septic tank is provided. The modified septic tank performs the normal functions of such a tank, e.g., removal of particulate matter from influent wastewater as well as the solids generated by the biological treatment and the anaerobic digestion of all such organic solids in addition to providing a short, e.g, 2 to 4 hours, detention time for the wastewater and the virtual absence of dissolved hydrogen sulphide gas in the effluent.

Pursuant to the invention, a tank is supplied with a plurality, usually at least three, troughs extending from one end of the tank to the other end. The troughs extend downwardly into the tank to within from about 3 to 10 feet of its bottom and terminate in downwardly converging walls defining a slot through which settled solids can pass from the interior of the troughs into the lower accumulating and digesting zone. The total tank depth is usually not less than 10 feet nor more than 18 feet.

Raw wastewater is supplied to the new tank and divided by appropriate means such as a splitter box or notched weir plate to provide each trough with a substantially equal portion of the influent wastewater. The wastewater flows through the troughs, in parallel, wherein it is retained for from 2 to 4 hours during which time solids such as sand, grit and particulate raw and biological organics settle down and into the lower accumulation zone through the slot at the bottom of each trough.

In further accordance with a specific aspect of the invention, the effluent from the improved septic tank is supplied to a biological treatment plant. Primarily, because of the short wastewater detention time in the septic tank, i.e., 2 to 4 hours, the septic tank effluent is virtually free from significant amounts of dissolved hydrogen sulphide. To further insure a minimal concentration of hydrogen sulphide in the septic tank effluent, baffling means to inhibit the passage of evolved gasses from the lower digestion chamber into the settling troughs is provided. By minimizing the concentration of evolved hydrogen sulphide in the influent to the downstream biological treatment unit, the surface available for growing and maintaining biological slimes that metabolize carbonaceous and/or nitrogenous pollutants is maximized with the consequent maximum reduction of these pollutants in the final effluent of the treatment plant.

BRIEF DESCRIPTION OF THE DRAWINGS

FIG. 1 is a cross-sectional diagrammatic representation of the treatment plant of the invention, shown in elevation.

FIG. 2 is a cross-sectional elevation of the modified septic tank taken along line 2—2 of FIG. 1.

FIG. 3 is a partial elevational view of the supply weir of the modified septic tank taken along line 3—3 of FIG. 1.

FIG. 4 is a partial cross-sectional view of the modified septic tank taken along line 4—4 of FIG. 5.

FIG. 5 is a top plan view of the modified septic tank shown in FIG. 1.

DESCRIPTION OF PREFERRED EMBODIMENTS

Referring to FIG. 1, a wastewater treatment plant is shown. The plant includes a raw wastewater supply line 10 to feed wastewater to a modified septic tank 11 wherein solids are settled out and organic solids are digested. The wastewater flows through the troughs 12 in from about 2 to 4 hours and is removed via an intermediate conduit 13 which supplies the settled wastewater to the biological treatment unit 14. Unit 14 utilizes rotating biological contactors to grow and maintain organisms that oxidize carbonaceous and/or nitrogenous pollutants in the wastewater. The multistage arrangement shown, i.e., three banks of contactors, is typically used in oxidizing carbonaceous matter in the wastewater and is described in detail in the aforementioned U.S. patents. A single stage of contactors operated within certain specific loading rates (gal/day/sq. ft) is disclosed in detail in aforementioned copending U.S. application Ser. No. 293,594 and can be used for the simultaneous oxidation of BOD and ammonia. The biologically treated wastewater is removed from unit 14 through conduit 15 and is supplied to a solids settler S. Sludge from settler S can be recirculated to supply line 10 for eventual digestion in the septic tank 11.

FIG. 2 illustrates septic tank 11 in further detail during operation. The tank 11 includes a plurality of flow-through troughs 12 arranged to receive wastewater in parallel and each designed to process a substantially equal amount of raw wastewater with a detention time of from about 2 to 4 hours. To insure that solids settled out in troughs 12 slide downwardly along converging walls 17 and 18 and through slot 19 (see FIG. 4) into the accumulation zone 20, the angle of inclined walls 17 and 18 with the vertical must be kept within certain limits. As shown in FIG. 4, the angle $\theta$ between walls 17 and 18 and the vertical should be about 30°, e.g., not greater than about 45° at which point solids accumulate on walls 17 and 18 and can block slot 19. Slot 19 should have a horizontal opening of from 4 to 12 inches, preferably about 8 inches.

Referring to FIG. 2, the distance ($d$) between adjacent troughs and between the end troughs and the wall of the tank should be at least one foot to permit digested matter to be removed from the bottom of the tank. The accumulation zone 20 is preferably 3 to 10 feet deep below the troughs while the total tank is about 10 to 18 feet deep. Troughs 12 are preferably about at least 2 feet deep measured along a vertical side all and have a width ($w$) of at least 2 feet although the foregoing dimensions can be scaled up or down depending on the specific application. Preferably, the total cross-sectional area transverse to the settling particles in the troughs should be maximized in a tank 11 of predetermined dimensions by minimizing the distances between troughs and the troughs and walls of the tank to that necessary to remove the accumulated sludge. The width ($w$) of the troughs should not exceed about 4 feet in order to obtain the proper angle $\theta$ as hereinbefore defined without having to make the troughs deeper than about 10 feet measured vertically from the slot to the upper edge of a vertical side wall. The width of the troughs should be maintained between 2 to 4 feet while the distance between troughs is minimized to about 1 foot. The length L of the troughs should be limited to result in a substantially equal distribution of settled solids along the bottom of the tank. Typically, the trough length should not be more than about 10 feet unless some provision, such as feeding some of the troughs from the opposite side of the tank from other of the troughs, is made. The number of troughs should be increased in order to obtain a required horizontal cross-sectional settling area for the desired 2 to 4 hour detention time, in any particular application.

FIG. 5 is a top plan view of the tank 11. Raw wastewater enters a distribution chamber 16 from supply conduit 10. Chamber 16 is separated from troughs 12 by weir plate 22 (see FIG. 3) which has a V-shaped notch 23 for each trough 12. Influent wastewater flows through each of the notches 23 from chamber 16 into each of the troughs 12. Chamber 16 functions to divide the incoming flow of wastewater into a number of equal portions determined by the number of troughs and to feed each trough with a substantially equal amount of wastewater in a parallel arrangement. Manifold 21 communicates with outlet 13 to simultaneously remove the wastewater from each trough. Other equivalent means to supply and remove wastewater from troughs 12 such as splitter boxes can be utilized in place of the specifically shown inlet and outlet means. For example, an outlet weir and chamber can be used in place of the manifold 21. The upper edge 24 of weir plate 22 is above the water level in tank 11 so that wastewater flows from chamber 16 only into troughs 12. A variable speed pump P can be provided in the conduit 13 supplying the biological treatment unit to control the flow rate and pollutant concentration entering unit 14. The pump P permits the tank 11 to additionally function as a flow and pollutant concentration equalizer that dampens the cyclic variations in the flow rate and strength of the raw wastewater entering the plant.

As shown in FIG. 4, the converging angular walls 17 and 18 of troughs 12 overlap in forming slot 19 with wall 17 extending beyond its projected point of intersection with wall 18 to form an extended flange portion. Gasses evolved during digestion of the sludge in accumulation zone 20 are deflected by the extended flange of wall 17 and are inhibited from entering the wastewater in the troughs. The evolved gasses after first saturating the stagnant wastewater contained in the interstices between the troughs and the troughs and side walls of the tank pass to the atmosphere.

As set forth in the foregoing description, the invention provides a septic tank that minimizes the concentration of evolved gasses, particularly hydrogen sulphide in the effluent wastewater. A downstream biological treatment plant such as a rotating contactor unit can then remove a maximum amount of carbonaceous and/or nitrogenous pollutants by biochemical oxidation, without sacrificing a portion of its available surface for oxidation of reduced sulfur compounds such as hydrogen sulphide. According to the invention, hydrogen sulphide concentration in the effluent wastewater is minimized by reducing the detention time in the septic tank to from 2 to 4 hours instead of the customary 24 hours, by the use of a plurality of troughs as defined by the invention arranged to receive influent wastewater flow in parallel and an overlapping baffle arrangement at the bottom terminus of each trough to inhibit the entrance of evolved gasses.

I claim:

1. A wastewater treatment plant for treating wastewater containing settleable organic solids, comprising a settling tank structure for confining said wastewater at a predetermined depth, said tank structure being defined by a pair of side walls separated by an end wall at each end and a bottom wall, inlet means disposed adjacent one of said end walls for supplying wastewater to said settling tank, outlet means disposed adjacent the other of said end walls for removing wastewater from said settling tank, a biological treatment unit including a plurality of rotatable contactors having surface area for the growth and maintenance of aerobic biological slimes, and conduit means for supplying effluent wastewater from said outlet means of said settling tank to said biological treatment unit, said settling tank structure including a plurality of troughs extending between and communicating with said inlet and outlet means, said troughs being arranged to receive wastewater from said inlet means in parallel, and to discharge wastewater to said outlet means in parallel, each of said troughs being spaced from each other and the side walls of said settling tank structure and including passage means for permitting solids settled therein to pass into the portion of said settling tank beneath said troughs and above said bottom wall wherein settled organic solids are digested anaerobically, said plurality of troughs being adapted to provide said wastewater with a detention time in said settling tank of from about 2 to about 4 hours and supply influent wastewater to said biological treatment unit that is virtually free from significant amounts of hydrogen sulphide.

2. A wastewater treatment plant according to claim 1, wherein said inlet means includes a receiving chamber for said wastewater defined by at least a portion of one end wall of said tank structure and a weir member spaced from and parallel to said end wall, said weir member adapted to evenly transmit wastewater in said receiving chamber to each of said troughs and to exclude a flow of wastewater from said receiving chamber into said tank structure.

3. Apparatus according to claim 1, wherein said outlet means includes a manifold simultaneously removing wastewater from each of said troughs.

4. A wastewater treatment plant according to claim 1, wherein said inlet means includes distribution means for simultaneously supplying each of said troughs with a substantially equal portion of said raw wastewater.

5. A wastewater treatment plant according to claim 1, wherein said passage means includes a baffled longitudinal slot extending along the bottom of each of said troughs along its full length.

6. A wastewater treatment plant according to claim 5, wherein said longitudinal slot is formed by downwardly converging wall members of each of said troughs and one of said converging wall members extends below the point where the converging wall members would intersect.

7. A wastewater treatment plant according to claim 1, wherein said plurality is at least 3.

8. A treatment plant according to claim 1, wherein said predetermined depth is from about 10 to about 18 feet and the distance beneath said troughs and above said bottom wall is from about 3 to about 10 feet.

9. A treatment plant according to claim 8, wherein the distance between said end wall is not more than about 10 feet.

10. A treatment plant according to claim 9, wherein the width of each of said troughs is from about 2 to about 4 feet.

* * * * *